US012711766B2

(12) United States Patent
Lee et al.

(10) Patent No.: US 12,711,766 B2
(45) Date of Patent: Aug. 18, 2026

(54) TEXT-TAGGED MOTION GENERATION APPARATUS AND OPERATION METHOD THEREOF

(71) Applicant: AILIVE INC., Seongnam-si (KR)

(72) Inventors: Dohee Lee, Seongnam-si (KR); Kyoungchin Seo, Bucheon-si (KR); Jihun Kim, Gunpo-si (KR); Jungmin Chung, Yongin-si (KR)

(73) Assignee: AILIVE INC., Seongnam-si (KR)

( * ) Notice: Subject to any disclaimer, the term of this patent is extended or adjusted under 35 U.S.C. 154(b) by 0 days.

(21) Appl. No.: 19/191,357

(22) Filed: Apr. 28, 2025

(65) Prior Publication Data

US 2025/0259447 A1 Aug. 14, 2025

Related U.S. Application Data

(63) Continuation of application No. PCT/KR2024/014452, filed on Sep. 25, 2024.

(30) Foreign Application Priority Data

Oct. 12, 2023 (KR) ........................ 10-2023-0135541

(51) Int. Cl.
*G06V 20/40* (2022.01)
*G06N 20/00* (2019.01)
*G06V 40/20* (2022.01)

(52) U.S. Cl.
CPC ............. *G06V 20/41* (2022.01); *G06N 20/00* (2019.01); *G06V 20/46* (2022.01); *G06V 40/23* (2022.01)

(58) Field of Classification Search
None
See application file for complete search history.

(56) References Cited

U.S. PATENT DOCUMENTS 6,661,418 B1 12/2003 McMillan et al.
2023/0260183 A1* 8/2023 Anderson .............. G06T 13/40 345/473

(Continued)

FOREIGN PATENT DOCUMENTS

CN 116206024 A * 6/2023 ............. G06T 13/40
DE 102019120655 A1 * 2/2021 ............. G06V 40/23

(Continued)

OTHER PUBLICATIONS

International Search Report issued in PCT/KR2024/014452 mailed on Dec. 20, 2024.

(Continued)

*Primary Examiner* — David Ometz
(74) *Attorney, Agent, or Firm* — Studebaker Brackett PLLC

(57) ABSTRACT

Disclosed is a motion generation device tagged with text and an operation method thereof. The motion generation device may include a memory configured to store at least one instruction; and at least one processor configured to execute the at least one instruction stored in the memory, wherein the at least one processor is configured to: obtain animation data including a character, convert the obtained animation data into intermediate data for generating a motion of the character over a plurality of frames, generate the motion of the character based on the converted intermediate data, generate a caption for each of the plurality of frames included in the generated motion of the character, generate a text corresponding to the motion of the character by providing the plurality of generated captions to a language model, and generate the text-tagged motion by labeling the generated text to the motion of the character.

5 Claims, 7 Drawing Sheets

(56) References Cited

U.S. PATENT DOCUMENTS

| | | | | |
|---|---|---|---|---|
| 2024/0257470 | A1* | 8/2024 | Gupta | G06F 40/40 |
| 2024/0264658 | A1* | 8/2024 | Ali Akbarian | G06V 10/82 |

FOREIGN PATENT DOCUMENTS

| | | | |
|---|---|---|---|
| KR | 10-2022-0133141 | A | 10/2022 |
| KR | 10-2023-0075998 | A | 5/2023 |
| KR | 10-2023-0138745 | A | 10/2023 |
| KR | 10-2708192 | B1 | 9/2024 |

OTHER PUBLICATIONS

Guo et al., "Generating Diverse and Natural 3D Human Motions from Text," Proceedings of the IEEE/CVF Conference on Computer Vision and Pattern Recognition (CVPR), Jun. 2022, pp. 5152-5161.

Plappert et al., "The KIT Motion-Language Dataset," Big Data, vol. 4, No. 4., 2016, pp. 236-252.

Xiang et al., "Generative Action Description Prompts for Skeleton-based Action Recognition," Proceedings of the IEEE/CVF Conference on Computer Vision and Pattern Recognition (CVPR), Jun. 2022, pp. 10276-10285.

Yang et al., "Entity-aware and Motion-aware Transformers for Language-driven Action Localization in Videos," Computer Vision-ECCV 2022; pp. 1-10; https://arxiv.org/abs/2205.05854.

* cited by examiner

Figure 4:
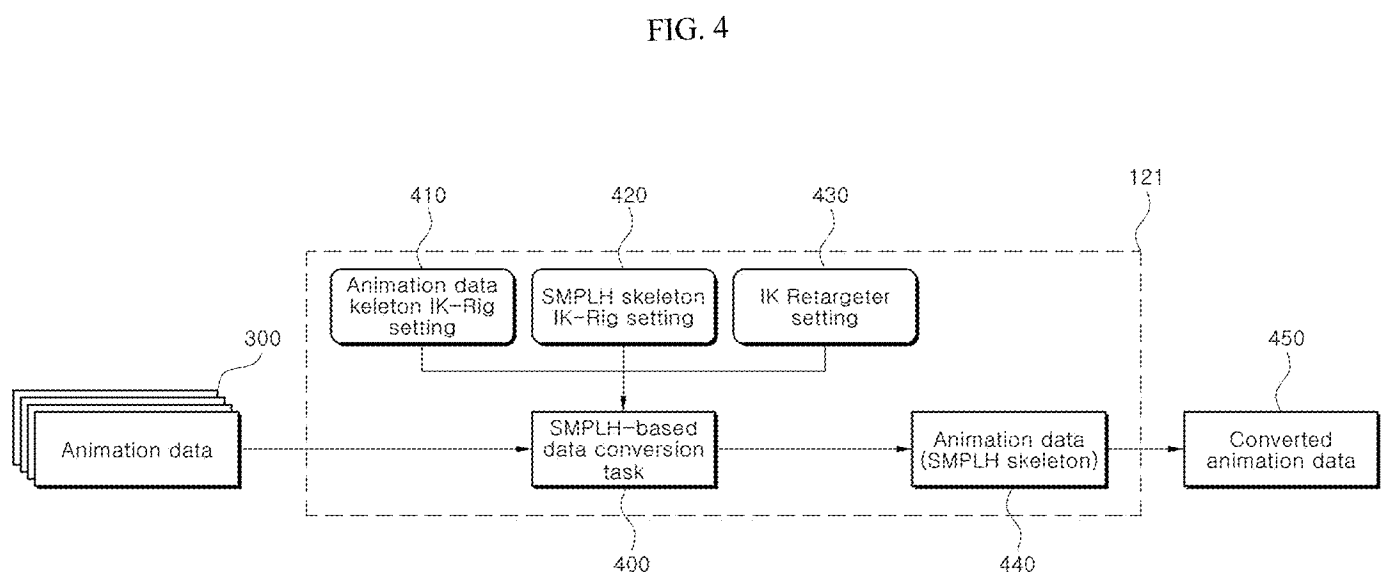

300
Animation data
121
410
Animation data keleton IK-Rig setting
420
SMPLH skeleton IK-Rig setting
430
IK Retargeter setting
400
SMPLH-based data conversion task
440
Animation data (SMPLH skeleton)
450
Converted animation data

FIG. 5

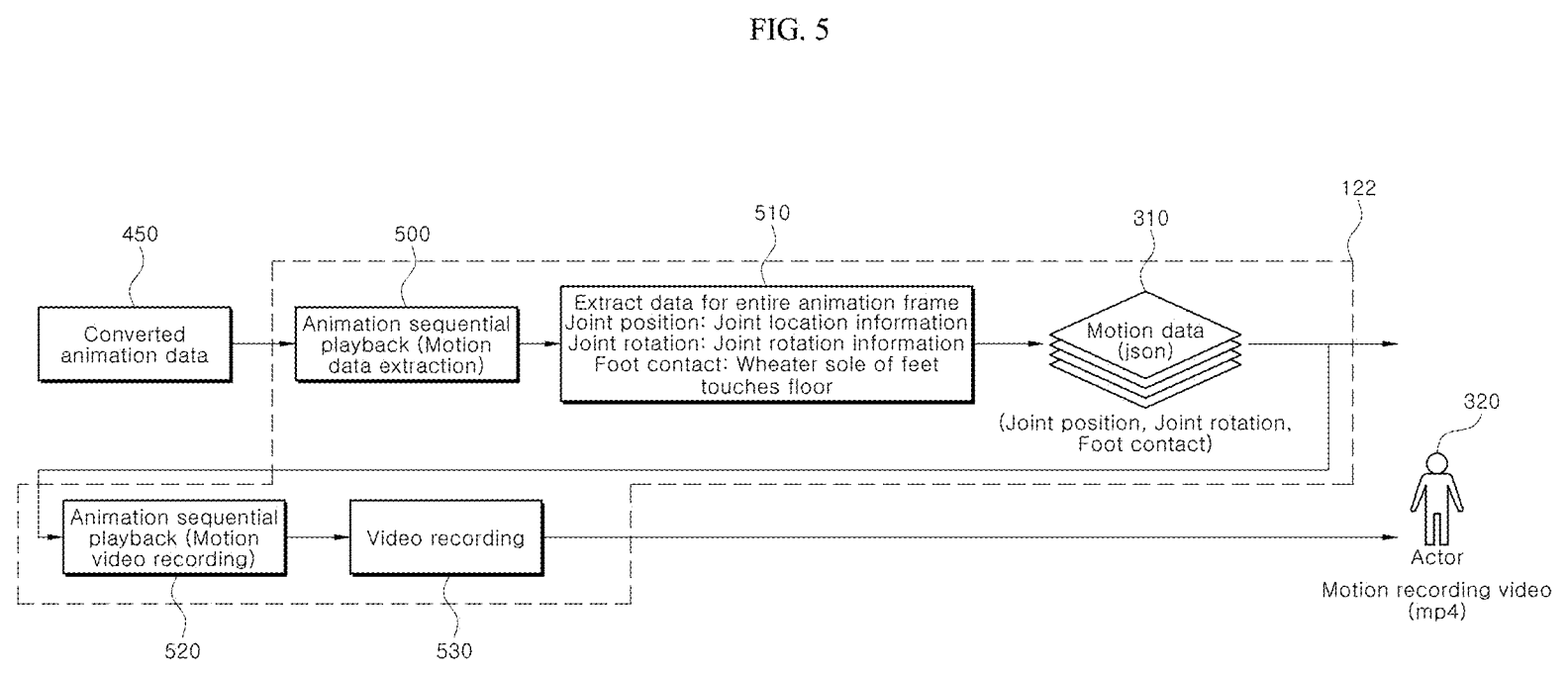

450
Converted animation data
500
Animation sequential playback (Motion data extraction)
510
Extract data for entire animation frame
Joint position: Joint location information
Joint rotation: Joint rotation information
Foot contact: Wheater sole of feet touches floor
310
Motion data (json)
(Joint position, Joint rotation, Foot contact)
122
520
Animation sequential playback (Motion video recording)
530
Video recording
320
Actor
Motion recording video (mp4)

FIG. 6

TEXT-TAGGED MOTION GENERATION APPARATUS AND OPERATION METHOD THEREOF

CROSS-REFERENCE TO RELATED APPLICATIONS

The present application is a continuation of International Patent Application No. PCT/KR2024/014452, filed on Sep. 25, 2024, which is based upon and claims the benefit of priority to Korean Patent Application No. 10-2023-0135541 filed on Oct. 12, 2023. The disclosures of the above-listed applications are hereby incorporated by reference herein in their entirety.

BACKGROUND

1. Technical Field

The present disclosure relates to a motion generation device, and more particularly, to a motion generation device tagged with text and an operation method thereof.

2. Description of Related Art

Recently, with the advancement of technology, techniques are being used to extract features from texts, by considering the content of the text or the context of the text, estimate the motion of characters such as avatars, or generate the motion of characters that perform actions included in the text.

The technology of extracting features from such text and generating character motion can utilize the recently developed artificial intelligence model. However, in order to develop an artificial intelligence model for extracting features from input text and inferring character motion, a process of training the artificial intelligence model to perform the corresponding motion is required. In this case, in order to train the artificial intelligence model, good quality training data in which the character motion corresponding to the text is labeled is required.

SUMMARY

The present disclosure can construct data for training an artificial intelligence model for inferring the motion of a character by extracting features from text containing information about the motion of an input character.

Specifically, the motion of a character can be extracted from animation data acquired through a game or a filming, and a text corresponding to the extracted motion of the character can be generated using a language model, and then the text can be labeled to the motion of the character, thereby generating learning data including the motion tagged with text.

In addition, in the process of generating text corresponding to the motion of the character extracted using a language model, in the case that an inappropriate text is generated, a correction request can be made to generate the text again.

Technical problems of the inventive concept are not limited to the technical problems mentioned above, and other technical problems not mentioned will be clearly understood by those skilled in the art from the following description.

In an aspect of the present disclosure, a motion generation device for generating a text-tagged motion may be provided. The motion generation device may include a memory configured to store at least one instruction. The motion generation device may include at least one processor configured to execute the at least one instruction stored in the memory. The at least one processor may obtain animation data including a character. The at least one processor may convert the obtained animation data into intermediate data for generating a motion of the character over a plurality of frames. The at least one processor may generate the motion of the character based on the converted intermediate data. The at least one processor may generate a caption for each of the plurality of frames included in the generated motion of the character. The at least one processor may generate a text corresponding to the motion of the character by providing the plurality of generated captions to a language model. The at least one processor may generate the text-tagged motion by labeling the generated text to the motion of the character.

In another aspect of the present disclosure, a method of operating a motion generation device for generating a text-tagged motion may be disclosed. The method of operating a motion generation device may include obtaining animation data including a character. The method of operating a motion generation device may include converting the obtained animation data into intermediate data for generating a motion of the character over a plurality of frames. The method of operating a motion generation device may include generating the motion of the character based on the converted intermediate data. The method of operating a motion generation device may include generating a caption for each of the plurality of frames included in the generated motion of the character. The method of operating a motion generation device may include generating a text corresponding to the motion of the character by providing the plurality of generated captions to a language model. The method of operating a motion generation device may include generating the text-tagged motion by labeling the generated text to the motion of the character.

In addition, a computer-readable recording medium recording a computer program for implementing the present disclosure may be further provided.

BRIEF DESCRIPTION OF THE FIGURES

FIG. 3 is a diagram for describing an operation of generating a motion of a character according to one embodiment of the present disclosure.

FIG. 4 is a diagram for describing an operation of the data conversion module according to one embodiment of the present disclosure.

FIG. 5 is a diagram for describing an operation of the motion generation module according to one embodiment of the present disclosure.

FIG. 6 is a diagram for describing an operation of generating text corresponding to a character motion according to one embodiment of the present disclosure and generating the text-tagged motion.

DETAILED DESCRIPTION

Figure 1:
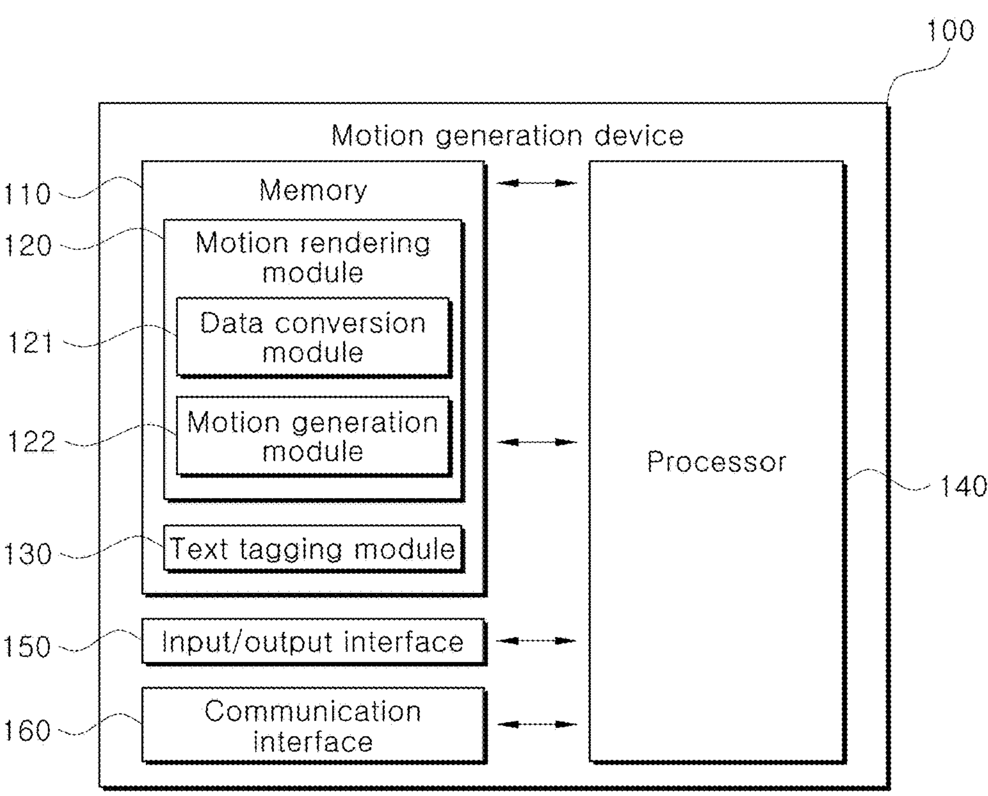
FIG. 1 is a block diagram illustrating a configuration of a motion generation device according to one embodiment of the present disclosure.

In the drawings, the same reference numeral refers to the same element. This disclosure does not describe all elements of embodiments, and general contents in the technical field to which the present disclosure belongs or repeated contents of the embodiments will be omitted. The terms, such as "unit, module, member, and block" may be embodied as hardware or software, and a plurality of "units, modules, members, and blocks" may be implemented as one element, or a unit, a module, a member, or a block may include a plurality of elements.

Furthermore, when a certain part "includes" a certain element, other elements are not excluded unless explicitly described otherwise, and other elements may in fact be included.

The terms "first," "second," and the like are just to distinguish an element from any other element, and elements are not limited by the terms.

The singular form of the elements may be understood into the plural form unless otherwise specifically stated in the context.

Identification codes in each operation are used not for describing the order of the operations but for convenience of description, and the operations may be implemented differently from the order described unless there is a specific order explicitly described in the context.

The operating principle and embodiments of the present disclosure are described below with reference to the attached drawings.

In this specification, the term 'device according to the present disclosure' includes all of various devices that can perform computational processing and provide results to the user. For example, the device may include all of a computer, a server device, and a portable terminal, or may be in the form of one of them.

Here, the computer may include, for example, a notebook, a desktop, a laptop, a tablet PC, a slate PC, and the like mounted with a web browser.

The server device is a server that communicates with an external device to process information, and may include an application server, a computing server, a database server, a file server, a mail server, a proxy server, and a web server.

A portable terminal is a wireless communication device that ensures portability and mobility, and may include all kinds of handheld-based wireless communication devices such as PCS (Personal Communication System), GSM (Global System for Mobile communications), PDC (Personal Digital Cellular), PHS (Personal Handyphone System), PDA (Personal Digital Assistant), IMT (International Mobile Telecommunication)-2000, CDMA (Code Division Multiple Access)-2000, W-CDMA (W-Code Division Multiple Access), WiBro (Wireless Broadband Internet) terminal, a smart phone, and the like, and a wearable device such as at least one of a watch, a ring, bracelets, anklets, a necklace, glasses, contact lenses, or a head-mounted device (HMD).

The function related to artificial intelligence according to the present disclosure operates through a processor and a memory. The processor may be composed of one or more processors. At this time, the one or more processors may be a general-purpose processor such as a CPU, an AP, a DSP (Digital Signal Processor), a graphics-only processor such as a GPU, a VPU (Vision Processing Unit), or an artificial intelligence-only processor such as an NPU. The one or more processors control input data to be processed according to a predefined operation rule or artificial intelligence model stored in the memory. Alternatively, in the case that the one or more processors are artificial intelligence-only processors, the artificial intelligence-only processor may be designed as a hardware structure specialized for processing a specific artificial intelligence model.

The predefined operation rule or artificial intelligence model may be created through learning. Here, being created through learning means that a basic artificial intelligence model is trained by using training data by a learning algorithm, thereby creating a predefined operation rule or artificial intelligence model set to perform a desired feature (or purpose). Such learning may be performed on the device itself in which the artificial intelligence according to the present disclosure is performed, or may be performed through a separate server and/or system. Examples of learning algorithms include supervised learning, unsupervised learning, semi-supervised learning, or reinforcement learning, but are not limited to the examples described above.

FIG. 1 is a block diagram illustrating a configuration of a motion generation device according to one embodiment of the present disclosure.

In one embodiment, referring to FIG. 1, a motion generation device 100 may be a device that generates a motion of a character, a text corresponding to the motion of the character, and labels the generated character to the generated motion of the character to generate a text-tagged motion.

In one embodiment, in order to generate a text-tagged motion, the motion generation device 100 may obtain animation data including a character, and generate a character motion based on the obtained animation data. In one embodiment, the motion generation device 100 may generate a text corresponding to the generated character motion using a Large Language Model (LLM). In one embodiment, the motion generation device 100 may label a text generated corresponding to the character motion to the character motion generated based on the animation data to generate the text-tagged motion.

In this case, the character may be an object that may move, such as a person, an animal, a character in a novel or a cartoon, an avatar, a character in a game, and the like, and is not limited thereto. The motion of the character may include motion data including at least one of the position information of the character's joint, the rotation information of the joint, or the contact information between the floor and the foot for each of a plurality of frames. The motion of the character may include a motion image spanning a plurality of frames obtained by retargeting the motion data to the character and rendering it. In one embodiment, the text corresponding to the motion of the character may be a sentence describing the motion indicating the movement, position, pose, and the like of the character.

At this time, the motion generation device 100 may provide the motion image to the large language model to generate the text corresponding to the motion image. In one embodiment, the text-tagged motion may be data including a set of text corresponding to the motion image and motion data. In one embodiment, the text-tagged motion may be used as learning data used to train an artificial intelligence model that receives motion data and infers the text corresponding to the motion data.

Referring to FIG. 1, in one embodiment, the motion generation device 100 may include a memory 110, at least one processor 140, an input/output interface 150, and a communication interface 160. However, the components illustrated in FIG. 1 are not essential for implementing the motion generation device 100 according to the present disclosure. In one embodiment, the motion generation device 100 described in this specification may have more or fewer components than the components listed above. The memory 110, and at least one processor 140, the input/output interface 150, and the communication interface 160 may be electrically and/or physically connected to each other, respectively.

In one embodiment, the memory 110 may store data supporting various functions of the motion generation device 100 and a program for the operation of the at least one processor 140, may store input/output data (e.g., sentences, music files, still images, video images, etc.), may store a plurality of application programs or applications driven by the device, at least one data for the operation of the device, and at least one instruction.

In one embodiment, the memory 110 may include a motion rendering module 120 and a text tagging module 130 for performing an operation of generating the text-tagged motion. The motion rendering module 120 may include a data conversion module 121 and a motion generation module 122. A 'module' included in the memory 110 may mean a unit that processes a function or operation performed by the at least one processor 140. The 'module' included in the memory 110 may be implemented as software such as instructions, an algorithm, or a program code. At least some of these application programs may be downloaded from an external server via wireless communication.

In one embodiment, the text tagging module 130 may include an artificial intelligence model that has been pre-trained to perform each operation. The artificial intelligence model may include a plurality of neural network layers. Each of the plurality of neural network layers has a plurality of weight values, and performs a neural network operation through an operation between the operation result of the previous layer and the plurality of weights. The plurality of weights of the plurality of neural network layers may be optimized by the learning result of the artificial intelligence model. For example, the plurality of weights may be updated so that the loss value or cost value acquired from the artificial intelligence model is reduced or minimized during the learning process. The artificial neural network may include a deep neural network (DNN), for example, a convolutional neural network (CNN), a deep neural network (DNN), a recurrent neural network (RNN), a restricted boltzmann machine (RBM), a deep belief network (DBN), a bidirectional recurrent deep neural network (BRDNN), a transformer, deep Q-networks, or a boosting algorithm, but is not limited to the examples described above.

The text tagging module 130 may include an artificial intelligence model optimized through transfer learning and fine tuning of a pre-trained model to perform the corresponding operation.

The memory 110 may include at least one type of storage medium among a flash memory type, a hard disk type, a Solid State Disk (SSD) type, a Silicon Disk Drive (SDD) type, a multimedia card micro type, a card type memory (e.g., an SD or XD memory, etc.), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk. In addition, the memory may be a database that is separate from the motion generation device 100 but connected by wire or wirelessly.

In one embodiment, the at least one processor 140 may be a general-purpose processor such as a CPU, an AP, a Digital Signal Processor (DSP), a graphics-only processor such as a GPU, a Vision Processing Unit (VPU), or an artificial intelligence-only processor such as an NPU. The at least one processor controls processing of patient-related information according to instructions stored in a memory or an artificial intelligence model. Alternatively, in the case that the at least one processor is an artificial intelligence-dedicated processor, the artificial intelligence-dedicated processor may be designed with a hardware structure specialized for processing a specific artificial intelligence model.

In one embodiment, the at least one processor 140 may control the overall operations of the motion generation device 100. In one embodiment, the at least one processor 140 may control the operation of the motion generation device 100 by executing at least one command stored in the memory 110. In one embodiment, the at least one processor 140 may perform an operation of generating the text-tagged motion by executing at least one command or program code of the data conversion module 121, the motion generation module 122, and the text tagging module 130 included in the memory 110.

In one embodiment, the input/output interface 150 is configured to receive information from the outside or provide information to the outside. When animation data including a character is input through the input/output interface 150, the at least one processor 140 may control the motion generation device 100 to generate motion of the character based on the animation data. In addition, the motion generation device 100 may provide the generated text-tagged motion to a peripheral electronic device through the input/output interface 150.

In one embodiment, the communication interface 160 may perform data communication between an external server or other electronic devices in the vicinity and the motion generation device 100.

In one embodiment, the communication interface 160 may include one or more components that enable communication with an external server or other electronic devices in the vicinity, and may include at least one of a wireless communication module, a short-range communication module, and a location information module, for example.

The wireless communication module may include a wireless communication module that supports various wireless communication methods such as a WiFi module, a WiBro (Wireless broadband) module, GSM (Global System for Mobile Communication), CDMA (Code Division Multiple Access), WCDMA (Wideband Code Division Multiple Access), UMTS (Universal Mobile Telecommunications System), TDMA (Time Division Multiple Access), LTE (Long Term Evolution), 4G, 5G, and 6G.

The wireless communication module may include a wireless communication interface including an antenna and a transmitter for transmitting a data signal. In addition, the wireless communication module may further include a data signal conversion module that modulates a digital control signal output from the at least one processor 140 through the wireless communication interface into an analog wireless signal under the control of at least one processor 140.

The wireless communication module may include a wireless communication interface including an antenna and a receiver for receiving a data signal. In addition, the wireless communication module may further include a data signal conversion module for demodulating an analog wireless signal received through a wireless communication interface into a digital control signal.

The short-range communication module is for short-range communication, and may support short-range communication using at least one of Bluetooth™, RFID (Radio Frequency Identification), Infrared Data Association (IrDA), UWB (Ultra Wideband), ZigBee, NFC (Near Field Communication), Wi-Fi (Wireless-Fidelity), Wi-Fi Direct, and Wireless USB (Wireless Universal Serial Bus) technologies.

In one embodiment, the motion generation device 100 may communicate with an external server or a peripheral electronic device through the communication interface 160. In one embodiment, the external server may include an application server, a computing server, a database server, a file server, a game server, a mail server, a proxy server, and a web server.

In one embodiment, the external server or the peripheral electronic device may include a model including a method for generating motion based on input information including text described in the present disclosure. The motion generation device 100 may receive a model including a method for generating motion based on input information including text from the external server or the peripheral electronic device through an input/output interface 150.

Hereinafter, for convenience of explanation, an operation for generating motion based on input information including a text is described as being performed in the motion generation device 100.

Figure 2:
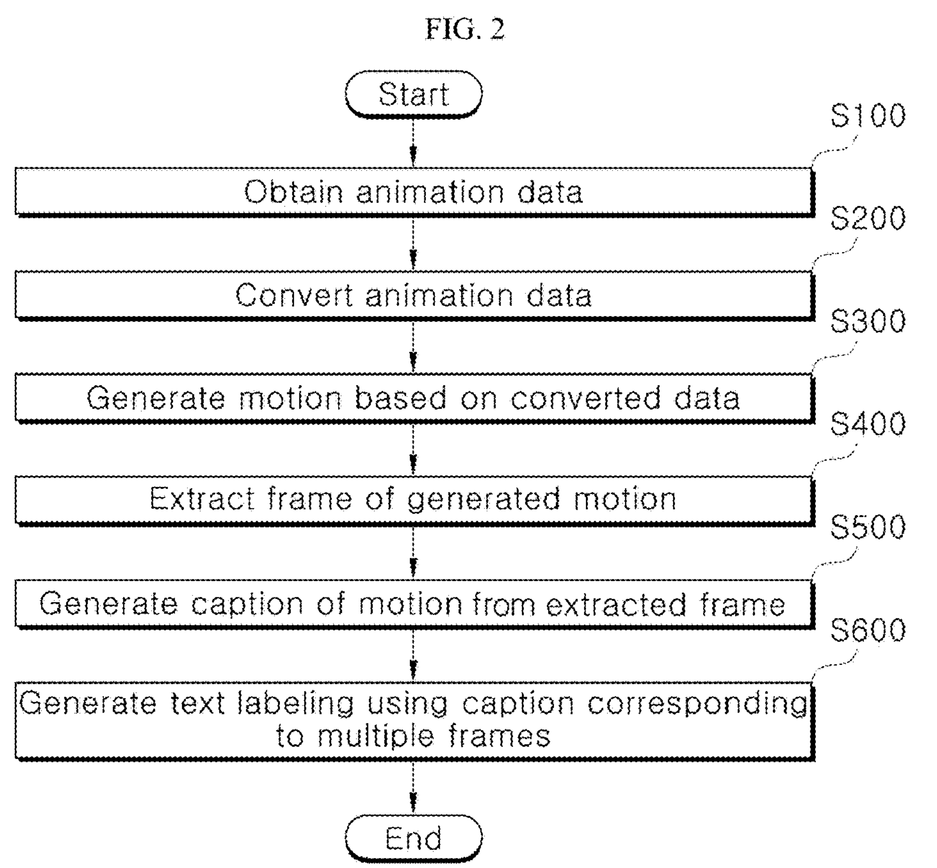
FIG. 2 is a flowchart for describing an operation of the motion generation device according to one embodiment of the present disclosure.

FIG. 2 is a flowchart for describing an operation of the motion generation device according to one embodiment of the present disclosure.

Referring to FIGS. 1 and 2, in one embodiment, the operating method of the motion generation device 100 may include a step S100 of obtaining animation data including a character. In one embodiment, in the step S100 of obtaining animation data, the at least one processor 140 may obtain animation data through an input/output interface 150 or a communication interface 160. However, the present disclosure is not limited thereto, and the at least one processor 140 may also read animation data already stored in the memory 110.

In one embodiment, the operating method of the motion generation device 100 may include a step S200 of converting the obtained animation data into intermediate data for generating a motion of a character over a plurality of frames. In one embodiment, in the step S200 of converting the animation data into the intermediate data, the at least one processor 140 may execute commands or program codes of the data conversion module 121 to convert the animation data into intermediate data. Hereinafter, the operation of converting the animation data into the intermediate data will be described later with reference to FIGS. 3 and 4.

In one embodiment, the operating method of the motion generation device 100 may include a step S300 of generating a motion of a character based on the converted intermediate data. In one embodiment, in the step S300 of generating a motion of a character, the at least one processor 140 may execute commands or program codes of the motion generation module 122 to generate a motion of a character based on the intermediate data. Hereinafter, the operation of generating a motion of a character based on the intermediate data will be described later with reference to FIGS. 3 and 5.

In one embodiment, the operating method of the motion generation device 100 may include a step S400 of extracting a plurality of frame images included in the motion of the generated character. In one embodiment, in the step S400 of extracting a plurality of frame images included in the motion of the character, the at least one processor 140 may extract a plurality of frame images included in the character motion by executing commands or program codes of the text tagging module 130. Hereinafter, the operation of extracting a plurality of frame images included in the motion of the generated character will be described later with reference to FIGS. 6 and 8.

In one embodiment, the operating method of the motion generation device 100 may include a step S500 of generating a caption corresponding to each of the extracted plurality of frame images. In one embodiment, in the step S500 of generating the caption corresponding to each of the plurality of frame images, the at least one processor 140 may generate a caption corresponding to each of the plurality of frame images by executing commands or program codes of the text tagging module 130. Hereinafter, the operation of generating a caption corresponding to each of the plurality of frame images will be described later with reference to FIGS. 6 and 9.

In one embodiment, the step S400 of extracting a plurality of frame images included in the character motion and the step S500 of generating a caption corresponding to each of the plurality of frame images are separately illustrated in FIG. 2, but the present disclosure is not limited thereto. In one embodiment, the operation of extracting a plurality of frame images included in the character motion and the step of generating a caption corresponding to each of the plurality of frame images may be performed in one step.

In one embodiment, the operating method of the motion generation device 100 may include a step S600 of providing a plurality of captions generated to a language model to generate text corresponding to the motion of the character. In one embodiment, in the step S600 of generating text corresponding to the motion of the character, the at least one processor 140 may generate text corresponding to the motion of the character by executing commands or program codes of the text tagging module 130, thereby providing a plurality of captions generated to the language model. Hereinafter, the operation of generating text corresponding to the motion of the character will be described later with reference to FIG. 6 and FIG. 10.

In one embodiment, the operating method of the motion generation device 100 may include a step of labeling text generated to the motion of the character to generate the text-tagged motion. In one embodiment, in the step of generating the text-tagged motion, the at least one processor 140 may label the text generated in the character's motion by executing the instructions or program codes of the text tagging module 130, thereby generating the text-tagged motion. The operation of generating the text-tagged motion will be described later with reference to FIGS. 6 and 10.

In one embodiment, the language model may mean a large language model. In addition, the operation of providing a plurality of captions to generate a text corresponding to the character's motion and the operation of labeling the text generated in the character's motion to generate the text-tagged motion may be performed in one step.

In one embodiment, the operating method of the motion generation device 100 may further include a step of obtaining a correction signal requesting to re-generate the text corresponding to the generated character motion. In one embodiment, in the step of obtaining the correction signal, at least one processor 140 may obtain the correction signal requesting to re-generate text corresponding to the motion of the generated character.

In one embodiment, the operating method of the motion generation device 100 may further include a step of providing information included in the correction signal and a plurality of generated captions to a language model, thereby re-generating text corresponding to the motion of the generated character. In one embodiment, in the step of re-generating text corresponding to the motion of the character, the at least one processor 140 may provide information included in the correction signal and a plurality of generated captions to a language model, thereby re-generating text corresponding to the motion of the generated character.

Hereinafter, the operation of obtaining the correction signal and the operation of re-generating text will be described later with reference to FIG. 6 and FIG. 10.

Figure 3:
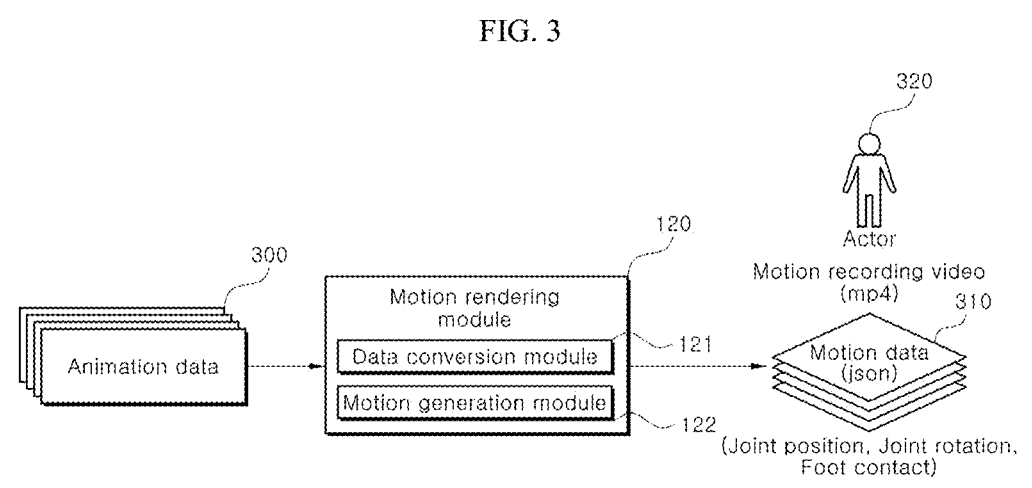

FIG. 3 is a diagram for describing an operation of generating a motion of a character according to one embodiment of the present disclosure.

Referring to FIGS. 1 and 3, in one embodiment, the at least one processor 140 may obtain animation data 300. In one embodiment, the animation data 300 may be data about the movement of a character across multiple frames. In one embodiment, the animation data 300 may be data about the motion of a character within a specific game, or may be data obtained by capturing the motion, but is not limited to either.

In one embodiment, at least one processor 140 may generate the motion of a character from the animation data 300 by executing instructions or program codes of the motion rendering module 120. In one embodiment, the motion of the character may include motion data 310 including at least one of position information of a joint of the character in each of the multiple frames, rotation information of the joint of the character, or contact information between the floor and the foot regarding whether the foot of the character touches the floor. The motion of the character may include a motion image 320 rendered by retargeting motion data to the character.

Specifically, the at least one processor 140 may convert the obtained animation data 300 into intermediate data for use in the motion generation module 122 by executing commands or program codes of the data conversion module 121. The at least one processor 140 may generate the motion of the character through the motion generation module 122 by using the intermediate data.

FIG. 4 is a diagram for describing an operation of the data conversion module according to one embodiment of the present disclosure. Hereinafter, the same drawing reference numerals are given to the same configurations as those described in FIG. 3, and redundant descriptions are omitted.

Referring to FIGS. 1, 3, and 4, in one embodiment, the at least one processor 140 may convert (400) the animation data 300 obtained through the data conversion module 121 into the intermediate data based on SMPL (Skinned Multi-Person Linear) Model. At this time, SMPL may be a data type used in the motion generation module 122. However, the present disclosure is not limited thereto, and the animation data 300 may be converted into intermediate data based on SMPL-H (SMPL +Hands parameter) or SMPL-X (SMPL+Hands+Face parameter) as needed.

Specifically, the at least one processor 140 may set an IK (Inverse Kinematics) Rig (Rigging) of a skeleton (e.g., a skeleton of a character) included in the animation data 300. The at least one processor 140 may set an IK-Rig of a skeleton based on SMPL-H. The at least one processor 140 may retarget an IK-Rig of a skeleton included in the animation data 300 to the set IK-Rig of the skeleton based on SMPL-H. Based on this, the at least one processor 140 may convert data of the animation data 300 into animation data 440 for the skeleton based on SMPL-H. At this time, animation data 440 for the skeleton based on SMPL-H may be intermediate data 450 into which the animation data 300 is converted.

FIG. 5 is a diagram for describing an operation of the motion generation module according to one embodiment of the present disclosure. Hereinafter, the same configurations as those described in FIGS. 3 and 4 are given the same drawing reference numerals, and duplicate descriptions are omitted.

Referring to FIGS. 1, 3, and 5, the at least one processor 140 may the generate motion data 310 and the motion image 320 included in the character motion from the converted intermediate data 450 by executing commands or program codes of the motion generation module 122.

In one embodiment, the at least one processor 140 may reproduce the converted intermediate data 450 (500 and 520). At this time, the at least one processor 140 may sequentially reproduce the converted intermediate data 450, the generate motion data 310 at a first reproduction time 500, and generate the motion image 320 at the second reproduction time 520.

In one embodiment, at the first reproduction time, the at least one processor 140 may extract motion data 510 from each of a plurality of frames included in the converted intermediate data 450. In one embodiment, the at least one processor 140 may extract joint position information, joint rotation information, and information on whether the foot touches the floor foot contact of the SMPL-H-based skeleton in each frame.

At this time, the extracted information may be 2D or 3D information. In the case that the extracted information is 3D, the joint position information of the skeleton may include the position relative to the world in which the skeleton is included. The joint rotation information of the skeleton may include local rotation information on the reference axis x-axis, y-axis, or z-axis. The information on whether the foot touches the floor foot contact may include a total of four pieces of information calculated through a collision determination algorithm between the forefoot and heel of both feet and the floor.

In one embodiment, during the first playback, the at least one processor 140 may extract (510) motion data from each of a plurality of frames included in the converted intermediate data 450 to generate the motion data 310. At this time, the motion data 310 may be generated in the Json (Javascript object notation) type. The motion data 310 generated as a Json type may store each skeleton joint and position information, rotation information, and whether the ground is in contact as a key-value pair.

In one embodiment, when playing back for the second time, the at least one processor 140 may retarget the extracted motion data 310 to the character and render it (520). As the extracted motion data 310 renders the retargeted character, the motion of the character may be played back based on the position information (joint position) of the skeleton joint, the rotation information (joint rotation) of the joint, and the information (foot contact) on whether the foot touches the ground included in the extracted motion data 310.

In one embodiment, the at least one processor 140 may store the motion of the character being played back and generate the motion image 320. At this time, the at least one processor 140 may record 530 the character motion being played and generate the motion recording video as the motion image 320. At this time, the motion image 320 may be generated in the type of mp4, which is part of MPEG (Moving Picture Experts Group-4), but the present disclosure is not limited thereto and may be generated as various types of video files.

In one embodiment, the at least one processor 140 may generate the character motion including a set of the motion data 310 and the motion image 320 using the motion generation module 122.

Figure 6:
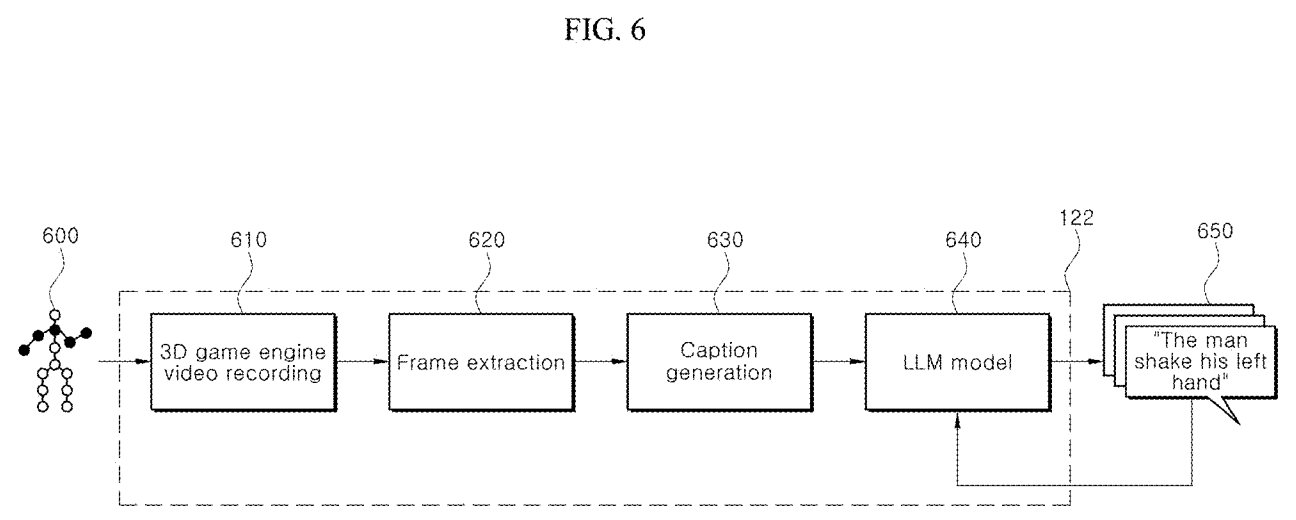

FIG. 6 is a diagram for describing an operation of generating text corresponding to a character motion according to one embodiment of the present disclosure and generating the text-tagged motion.

Referring to FIG. 1 and FIG. 6, in one embodiment, FIG. 6 illustrates an operation in which the at least one processor 140 generates a text 650 corresponding to a motion 600 of a character using the text tagging module 130 and labels the generated text to the motion 600 of the character. Hereinafter, for convenience of explanation, the motion 600 of the character will be referred to as the motion data 600.

In one embodiment, the at least one processor 140 may record 610 an image using information of the motion data 600. At this time, the at least one processor 140 may record 610 an image implemented by rendering the motion data 600 using a 3D game engine. At this time, the image generated by recording (610) an image implemented by rendering the motion data 600 may be replaced with the motion image 320 illustrated in FIG. 5. In this case, the at least one processor 140 may utilize the motion image 320 without rendering and recording the motion data 600. Hereinafter, for convenience of explanation, it is described that the at least one processor 140 generates a text 650 corresponding to the motion of the character using the motion image 320.

In one embodiment, the motion image 320 may be an image played over a plurality of frames. The at least one processor 140 may extract (620) a plurality of frame images included in the motion image 320.

In one embodiment, the at least one processor 140 may generate (630) a caption from each of the extracted plurality of frame images. At this time, the caption may be a text for explaining the content of each frame image.

In one embodiment, the at least one processor 140 may provide multiple captions to a large language model 640 to generate a text 650 corresponding to the motion image 320 spanning multiple frames. At this time, the large language model 640 may also be referred to as a language model.

At this time, in the case that a correction signal requesting to re-generate the text 650 is obtained, it is determined that the generated text 650 does not correspond to the motion image 320, and the text 650 may be generated again using the information included in the correction signal and the motion image 320. In one embodiment, the at least one processor 140 may label the motion image 320 with the text 650 to generate the text-tagged motion. In addition, the at least one processor 140 may generate the text-tagged motion by labeling the motion data 310, see FIG. 5 corresponding to the motion image 320 with the text 650. At this time, the text-tagged motion labeled with the motion data 600 and the text 650 may be used as learning data for training an artificial intelligence model that receives specific motion data and infers a corresponding specific text.

Since the text-tagged motion generated through the motion rendering module 120 and the text tagging module 130 may be used as learning data, it becomes easy to obtain learning data for training an artificial intelligence model that receives specific motion data and infers a corresponding specific text, and various learning data may be obtained, so that an artificial intelligence model with improved inference performance may be obtained.

Figure 7:
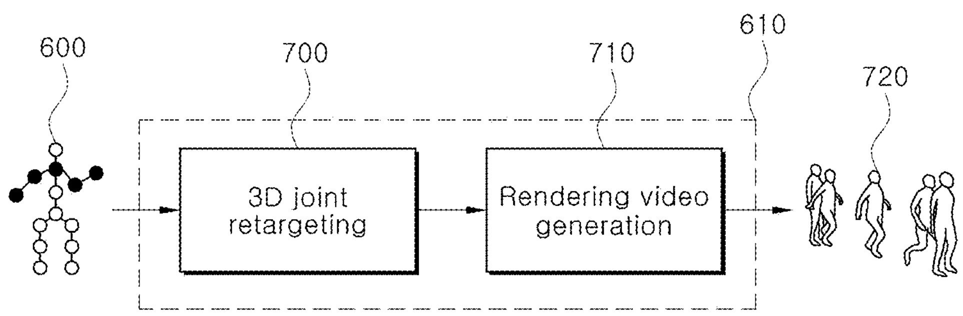
FIG. 7 is a diagram for describing an operation of generating a character motion according to one embodiment of the present disclosure.

FIG. 7 is a diagram for describing an operation of generating a character motion according to one embodiment of the present disclosure. Hereinafter, the same configuration as that described in FIG. 6 is given the same drawing reference numerals, and redundant descriptions are omitted.

Referring to FIG. 1, FIG. 6, and FIG. 7, in one embodiment, the at least one processor 140 may retarget (700) the motion data 600 to a character. At this time, the character may include a 2D character or a 3D character. The character may be a character included in the animation data (300, see FIG. 4) or may be designated as a new character.

In one embodiment, the at least one processor 140 may render (710) a character to which the motion data 600 is retargeted, thereby generating an image of the character moving. At this time, the at least one processor 140 may record the generated image, thereby generating a motion image 720 representing the movement of the character during a plurality of frames.

Figure 8:
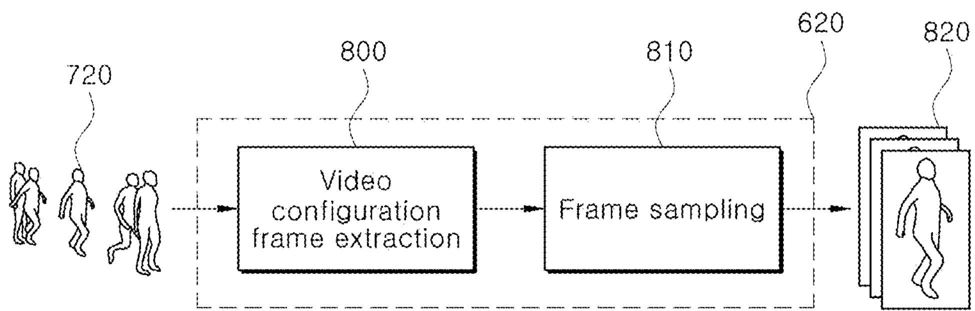
FIG. 8 is a diagram for describing an operation of extracting a plurality of frames included in a motion image according to one embodiment of the present disclosure.

FIG. 8 is a diagram for describing an operation of extracting a plurality of frames included in a motion image according to one embodiment of the present disclosure. Hereinafter, the same configuration as described in FIG. 6 is assigned the same drawing reference numerals, and redundant descriptions are omitted.

Referring to FIG. 1, FIG. 6, and FIG. 8, in one embodiment, the at least one processor 140 may extract (800) a plurality of frame images constituting a motion image 720. The motion image 720 represents the motion of a character across multiple frames, and the at least one processor 140 may extract frame images corresponding to each frame from the motion image 720.

In one embodiment, the at least one processor 140 may adjust (810) the FPS (Frames Per Second) of each of the extracted plurality of frame images so that the plurality of frame images 820 has a common frame interval.

Figure 9:
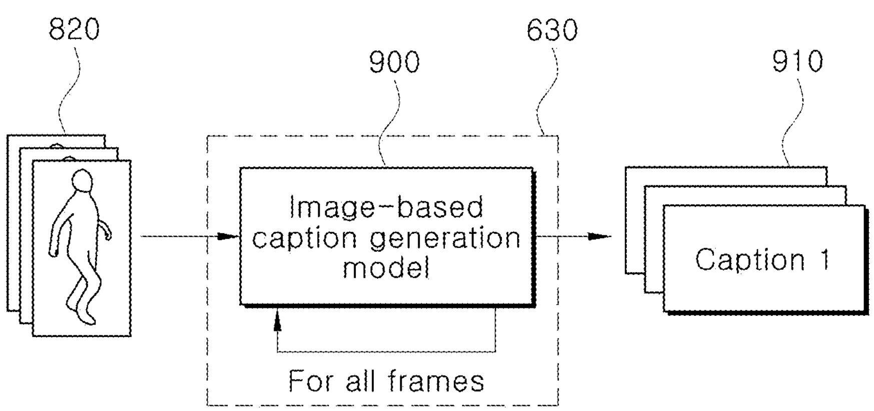
FIG. 9 is a diagram for describing an operation of generating multiple captions corresponding to each of the multiple frames according to one embodiment of the present disclosure.

FIG. 9 is a diagram for describing an operation of generating multiple captions corresponding to each of the multiple frames according to one embodiment of the present disclosure. Hereinafter, the same configuration as described in FIG. 6 is assigned the same drawing reference numerals, and redundant descriptions are omitted.

Referring to FIG. 1, FIG. 6, and FIG. 9, in one embodiment, the at least one processor 140 may generate a caption for each of the plurality of frame images 820 using an image-based caption generation model 900. At this time, the image-based caption generation model 900 may include a computer vision model and a natural language processing model. The image-based caption generation model 900 may include an artificial intelligence model that is pre-trained to receive an image corresponding to one frame and infer a caption of the corresponding image. In one embodiment, the image-based caption generation model 900 may include, but is not limited to, a CNN (Convolutional Neural Network), an RNN (Recurrent Neural Network), or a Transformer.

In one embodiment, the at least one processor 140 may generate a plurality of captions 910 by repeatedly generating a caption using an image-based caption generation model 900 for each of the plurality of frame images 820. The at least one processor 140 may generate the plurality of captions 910 corresponding to each of the plurality of frames based on each of the plurality of frame images 820.

Figure 10:
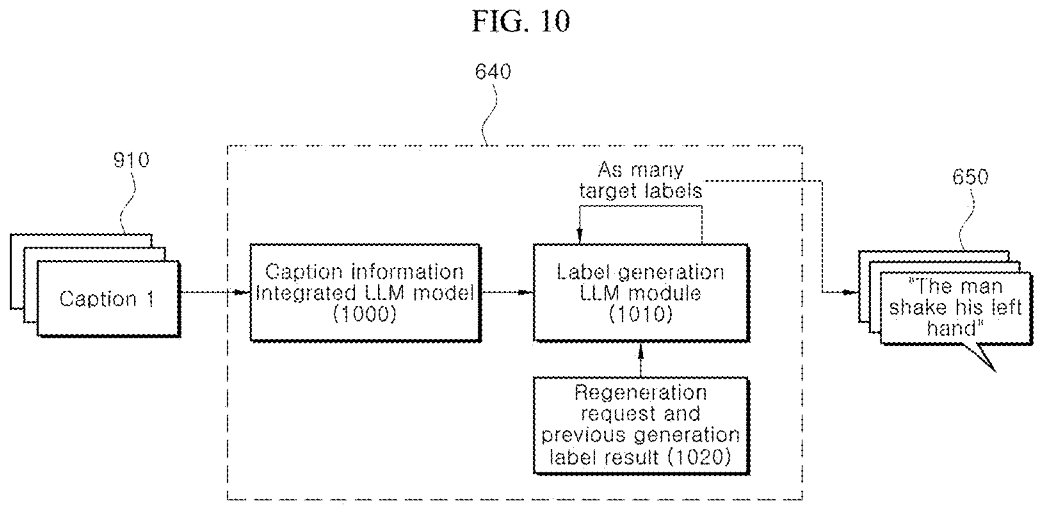
FIG. 10 is a diagram for describing an operation of generating text corresponding to a motion of a character according to one embodiment of the present disclosure and modifying the generated text.

FIG. 10 is a diagram for describing an operation of generating text corresponding to a motion of a character according to one embodiment of the present disclosure and modifying the generated text. Hereinafter, the same drawing reference numerals are given to the same configuration as that described in FIG. 6, and redundant descriptions are omitted.

Referring to FIG. 1, FIG. 6, and FIG. 10, in one embodiment, the at least one processor 140 may use a plurality of captions 910 to understand movement information of the motion image 600 spanning a plurality of frames, and generate the text 650 corresponding to the motion image 600.

In one embodiment, the at least one processor 140 may use a caption information integration language model module 1000 to extract an entire caption including the overall content of the motion image 600 from a plurality of captions 910. In one embodiment, the caption information integration language model module 1000 may be a module that integrates each of the plurality of captions, which are captions for each frame image, to generate an entire caption corresponding to the content of the motion image 600 spanning a plurality of frames.

In one embodiment, the at least one processor 140 may generate the text 650 corresponding to the entire caption using the label generation language model module 1010. The at least one processor 140 may provide the entire caption to a label generation language model module 1010 to generate the text 650 corresponding to the motion image 600.

At this time, the at least one processor 140 may set a target number of labels and generate the text 650 corresponding to the entire caption as many as the target number of labels using the label generation language model module 1010. In this case, multiple texts that explain the movement of the character included in the motion image 600 from various viewpoints may be generated. Through this, in generating learning data for training an artificial intelligence model that receives specific motion data and infers the corresponding specific text, multiple learning data sets may be generated using multiple texts corresponding to one motion data 600.

In one embodiment, the at least one processor 140 may obtain (1020) a correction signal requesting re-generation of text after generating the text 650 corresponding to the motion image 600. At this time, the correction signal may be a signal generated by comparing the generated text 650 with the motion data 600 and determining that the generated text 650 does not correspond to the motion data 600. In one embodiment, the correction signal may be a signal generated by comparing the text 650 with at least one word determined to represent the preset motion data 600 and determining that the at least one word is not included in the text 650. In addition, the at least one processor 140 may obtain the correction signal by the input/output interface 150 or the communication interface 160.

In one embodiment, the at least one processor 140 may provide the signal and the plurality of captions 910 included in the correction signal to the language model 640 to regenerate the text 650 corresponding to the motion data 600. Through this process, the parameters included in the language model 640 may be improved, so that the performance of the language model 640 may be improved.

In one embodiment, the at least one processor 140 may label the generated text 650 with the motion data 600 to generate the text-tagged motion.

Meanwhile, the disclosed embodiments may be implemented in the form of a recording medium storing instructions executable by a computer. The instructions may be stored in the form of program codes and, when executed by a processor, may generate a program module to perform the operations of the disclosed embodiments. The recording medium may be implemented as a computer-readable recording medium.

The computer-readable recording medium includes all kinds of recording media storing instructions that may be deciphered by a computer. For example, there may be ROM (Read Only Memory), RAM (Random Access Memory), a magnetic tape, a magnetic disk, a flash memory, an optical data storage device, and the like.

The disclosed embodiments have been described with reference to the attached drawings as described above. Those skilled in the art to which the present disclosure pertains will understand that the present disclosure may be implemented in a different form from the disclosed embodiments without changing the technical idea or essential features of the present disclosure. The disclosed embodiments are exemplary and should not be construed as limiting.

According to the present disclosure, the motion generation device can easily obtain the character motion for generating learning data by extracting the character motion from animation data when generating the text-tagged motion. In addition, the motion generation device can easily obtain the text corresponding to the character motion by generating the corresponding text from the extracted character motion using a language model.

Through this, learning data, which is the text-tagged motion in which the character motion is labeled with text, can be easily obtained.

In addition, the text corresponding to the character motion can be re-generated according to a modification request, so that high-quality learning data can be obtained.

The effects of the present disclosure are not limited to the effects mentioned above, and other effects not mentioned may be clearly understood by a person skilled in the art from the description.

What is claimed is:

1. A motion generation device for generating a text-tagged motion, comprising:

a memory configured to store at least one instruction; and at least one processor configured to execute the at least one instruction stored in the memory, wherein the processor is configured to:

obtain animation data including a character, convert the obtained animation data into intermediate data for generating a motion of the character over a plurality of frames, generate the motion of the character based on the converted intermediate data, using a motion rendering module, generate a caption for each of the plurality of frames included in the generated motion of the character, generate a text corresponding to the motion of the character by providing the plurality of generated captions to a language model, and generate the text-tagged motion by labeling the generated text to the motion of the character, wherein the obtained animation data includes data about the motion of the character and data obtained through motion capture, wherein the motion of the character includes motion data including at least one of position information of a joint of the character, rotation information of the joint, or contact information between a floor and a foot in each of the plurality of frames, and a motion image rendered by retargeting the motion data to the character, wherein the motion rendering module includes a data conversion module and a motion generation module, wherein the processor is configured to:

convert the obtained animation data into SMPL (Skinned Multi-Person Linear Model)-based intermediate data using the data conversion module, and sequentially play the converted intermediate data using the motion generation module, wherein during a first playback, motion data is generated by extracting motion data from each of the plurality of frames included in the converted intermediate data, and during a second playback, a motion image is generated, wherein the generated motion data is generated in a Json (Javascript object notation) type, and position information of skeleton joints, rotation information of the joints, and contact information with the floor are stored as key-value pairs, wherein the processor is configured to, during the second playback, play the motion of the character based on the position information of skeleton joints, the rotation information of the joints, and information on whether the feet are in contact with the floor included in the generated motion data, and wherein the processor is configured to:

extract a plurality of frame images included in the generated motion image, and generate the plurality of captions corresponding to each of the plurality of frames based on the extracted plurality of frame images.

2. The device according to claim 1, wherein the processor is configured to:

obtain a correction signal requesting to re-generate text corresponding to the motion of the generated character, and re-generate a text corresponding to the motion of the generated character by providing information included in the correction signal and the plurality of generated captions to the language model.

3. The device according to claim 1, wherein the generated text-tagged motion is learning data used to train an artificial intelligence model that receives the motion data and infers the text.

4. A method of operating a motion generation device for generating a text-tagged motion, performed by a processor, comprising:

obtaining animation data including a character, converting the obtained animation data into intermediate data for generating a motion of the character over a plurality of frames, generating the motion of the character based on the converted intermediate data, using a motion rendering module, generating a caption for each of the plurality of frames included in the generated motion of the character, generating a text corresponding to the motion of the character by providing the plurality of generated captions to a language model, and generating the text-tagged motion by labeling the generated text to the motion of the character, wherein the obtained animation data includes data about the motion of the character and data obtained through motion capture, wherein the motion of the character includes motion data including at least one of position information of a joint of the character, rotation information of the joint, or contact information between a floor and a foot in each of the plurality of frames, and a motion image rendered by retargeting the motion data to the character, wherein the motion rendering module includes a data conversion module and a motion generation module, wherein the processor is configured to:

convert the obtained animation data into SMPL (Skinned Multi-Person Linear Model)-based intermediate data using the data conversion module, and sequentially play the converted intermediate data using the motion generation module, wherein during a first playback, motion data is generated by extracting motion data from each of the plurality of frames included in the converted intermediate data, and during a second playback, a motion image is generated, wherein the generated motion data is generated in a Json (Javascript object notation) type, and position information of skeleton joints, rotation information of the joints, and contact information with the floor are stored as key-value pairs, wherein the processor is configured to, during the second playback, play the motion of the character based on the position information of skeleton joints, the rotation information of the joints, and information on whether the feet are in contact with the floor included in the generated motion data, and wherein the processor is configured to:

extract a plurality of frame images included in the generated motion image, and generate the plurality of captions corresponding to each of the plurality of frames based on the extracted plurality of frame images.

5. The method according to claim 4, further comprising:

obtaining a correction signal requesting to re-generate text corresponding to the motion of the generated character, and re-generating a text corresponding to the motion of the generated character by providing information included in the correction signal and the plurality of generated captions to the language model.

* * * * *